Nov. 17, 1936.  J. MURASCO  2,061,433
ELECTRIC TOASTER
Filed July 28, 1933  2 Sheets—Sheet 1

Inventor
J. MURASCO
By C. L. Parker, Jr.
Attorney

Nov. 17, 1936.  J. MURASCO  2,061,433
ELECTRIC TOASTER
Filed July 28, 1933   2 Sheets-Sheet 2
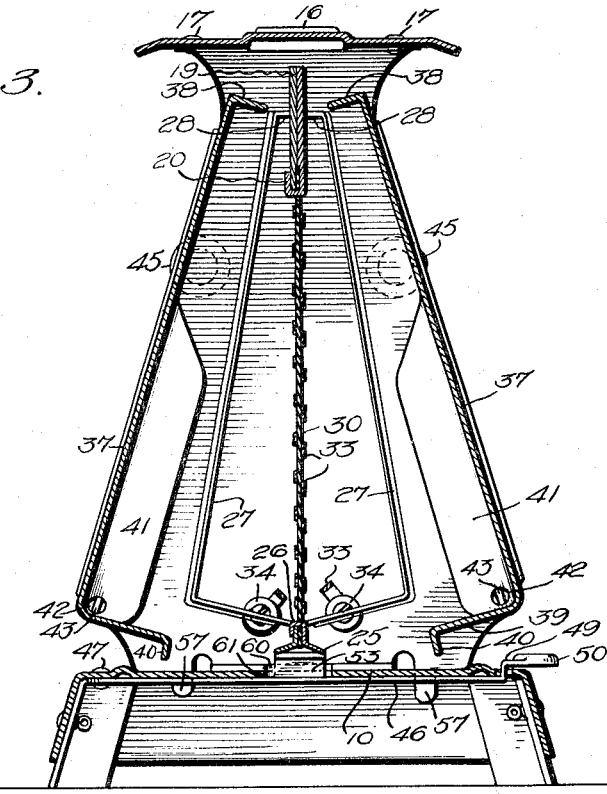
Fig. 3.
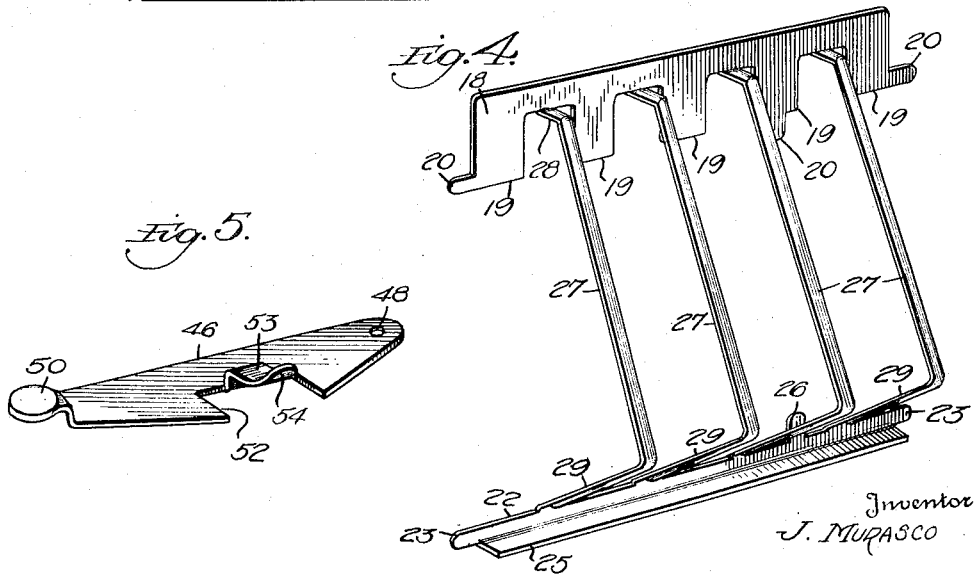
Fig. 4.
Fig. 5.
Inventor
J. MURASCO
By C. L. Parker, Jr.
Attorney Patented Nov. 17, 1936

2,061,433

UNITED STATES PATENT OFFICE

2,061,433

ELECTRIC TOASTER

Joseph Murasco, Sandusky, Ohio, assignor, by mesne assignments, to Weinig Made-Rite Company, Cleveland, Ohio, a corporation of Ohio Application July 28, 1933, Serial No. 682,679

13 Claims. (Cl. 53—5)

This invention relates to electric toasters.

It has become more and more the common practice to butter bread before toasting it, and with the usual domestic toasters, the operation of toasting the bread results in some of the butter dripping down upon the upper face of the base of the device, and it is extremely difficult to clean the device due to the fact that the entire structure is unitary. The common practice is to rigidly connect the upper structure of the toaster to the base so that it cannot be disconnected therefrom, and it is for this reason that the base of the device can be cleaned only with the greatest difficulty.

An important object of the present invention is to provide simple and novel means for detachably connecting the upper toaster construction to the base to permit its removal whereby all parts of the device may be easily and properly cleaned.

A further object is to provide a toaster of the character referred to wherein the upper structure can be disconnected from the base merely by operating a finger piece carried by a latch lever and projecting a short distance outwardly of the base.

A further object is to provide a novel combined bread rack and heating element supporting means which is of durable construction, and which is cheap to manufacture and easily assembled.

A further object is to provide a combined bread rack and heating element supporting means of the character referred to wherein two simple unitary sheet metal elements, which are exact duplicates of each other, form the opposite sides of the rack and combine to support the heating elements within the toaster.

Other objects and advantages of the invention will become apparent during the course of the following description.

In the drawings I have shown one embodiment of the invention. In this showing,

Figure 3 is a section on line 3—3 of Figure 1,

Figure 4 is a detail perspective view of one of the bread rack and heating element supporting members, and, Figure 5 is a similar view of the latching lever.

Figure 1:
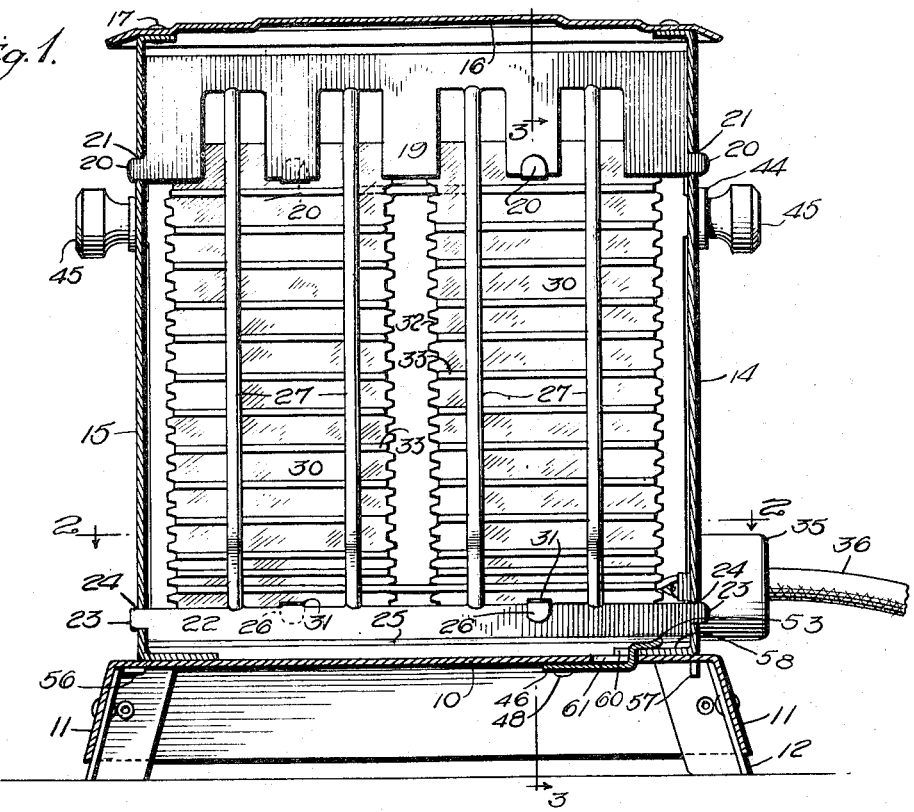
Figure 1 is a central vertical longitudinal sectional view.

Referring to the drawings, the numeral 10 designates the base of the toaster having depending skirt portions 11 at its sides and ends. Supporting feet 12, preferably formed of fiber or similar material, are riveted as at 13 to the skirt portions 11, thus providing feet upon which the toaster is adapted to rest and also providing means for rigidly securing the corner portions of the skirt members 11 with respect to each other.

The upper toaster construction comprises end walls 14 and 15 and a top 16 riveted or similarly secured to the end walls as at 17. It will be apparent that the top 16 rigidly secures the upper ends of the end walls 14 and 15 in position.

A pair of combined bread rack and heating element supporting members are arranged within the upper structure of the toaster and one of these elements has been illustrated in Figure 4. Each of the rack elements is integral and is preferably stamped from a single sheet of sheet metal of the proper gage. Each of these members comprises an upper plate 18 having spaced depending members 19 throughout its length, and the outermost members 19 are provided with lips 20 projecting through openings 21 formed in the side members 14 and 15. One of the depending members 19 adjacent the end of the upper member 18 is provided with a depending finger 20 for a purpose to be described.

Each rack member further includes a lower integral member 22 having fingers 23 at its ends projecting through openings 24 formed in the end members 14 and 15. Substantially no structural strength is required in the upper member 18, but it will become apparent that the member 22 forms the connecting means between the end members 14 and 15 when the latter is detached from the base in a manner to be referred to. Accordingly the lower member 22 is provided with an outstanding flange 25 arranged at a substantial angle to the member 22, and thus the lower element of the bread rack is of angular section and possesses substantial structural strength. When the device is assembled as shown in Figure 1, the extremities of the flange 25 engage against the inner faces of the end members 14 and 15. The transverse member 22 is provided with an upstanding finger 26, preferably arranged in the vertical plane of the finger 20 and the purpose of this finger will be referred to later.

The upper and lower members 18 and 22 are connected by integral rack members 27, preferably arcuate in cross-section to provide them with the proper degree of rigidity. The members 27 slope downwardly and outwardly throughout the greater portions of their lengths as indicated in Figures 3 and 4, and the upper extremities of the rack members extend inwardly as at 28 and join the member 18 between the depending members 19. The lower portions 29 of the rack members project downwardly and inwardly to join the member 22.

When the device is assembled the two rack members are arranged in face to face relation with the rack elements 27 projecting outwardly. A pair of mica sheets 30 is placed between the rack members substantially in the positions shown in Figure 1. The edge portions at the top of the mica sheets will be arranged between the central finger 18 and the outermost fingers 19, while the lower edges of the mica sheets will be arranged between the two members 22. These sheets are provided with openings 31 to receive the fingers 20 and 26 and these fingers are bent substantially at right angles to the sheets 30 when the latter are placed between the rack members. When these members have been placed in proper position the fingers 20 and 26 are bent around the opposite members 18 and 22 respectively, whereupon the entire combined rack and heating element support is assembled ready to be placed in the toaster. The fingers 20 and 23 of the two rack members are turned outwardly after they are inserted through the openings 21 and 24, whereupon the rack unit is secured in position within the side members 14 and 15. The mica sheets 30 are notched at 32 in accordance with the usual practice to receive the loops of the successive turns of a heating element 33 of the usual strip type. The ends of the heating element strip are connected to binding posts 34 extending through the end wall 14 and properly insulated therefrom. The outer ends of the binding posts are protected by a suitable cover 35, and a cable 36 leads into the cover 35 with its two wires connected to the binding posts 34. In this connection it will be noted that the binding posts of conventional toasters are secured to the bases of the toasters, whereas in the present case the binding posts are secured to an element of the upper structure, for a purpose which will become apparent.

Suitable doors of the bread turning type are connected to the end walls 14 and 15. Each door includes a body portion 37 having a top flange 38 forming a stop for the bread when the door is open. A relatively wide flange 39 extends inwardly from the bottom of each door and has its extremity turned downwardly as at 40. The flanges 39 support the bread slices and effect the turning thereof when the door is opened in accordance with the usual practice. Each door further includes side flanges 41 extending upwardly from the bottom of the door, as shown in Figure 3, and each flange 41 is provided with an opening 42 to receive an inwardly extending lip 43 carried by the adjacent end wall of the toaster to pivotally support the doors. Each edge portion of each door is provided with an ear 44 projecting inwardly in proximity to the adjacent end wall and provided with a handle or knob 45 whereby the doors may be opened.

Beneath the top of the base 10, a lever 46 is pivotally connected to the base by a rivet or the like 47 passing through an opening 48 formed in one end of the lever. The opposite end of the lever projects upwardly as at 49 and then outwardly to terminate in a finger piece 50. The upwardly extending portion 49 of the lever projects through a slot 51 formed in the base 10 adjacent one edge thereof. This slot is preferably arcuate and concentric with the pivot axis of the lever 46. The lever is notched in one edge as at 52, and within this notch, the lever is provided with an integral latch member 53 offset upwardly from the body of the lever and having its free end turned upwardly as at 54.

The lever is operative for latching the upper structure of the toaster to the base, and accordingly the lower ends of the end members 14 and 15 are properly constructed to form a detachable connection for the base. Adjacent each end, the base member 10 is provided with suitable openings 55 spaced a substantial distance apart. The end member 15 is provided with depending fingers 56 having their lower portions substantially horizontally arranged to be disposed beneath the adjacent portion of the top 10 of the base, as shown in Figure 1. The lower extremity of the side member 14 is provided with depending fingers 57 lying in the plane of the end member 14 and projecting through the corresponding openings 55. It will be apparent that the fingers 57 prevent horizontal movement of the end member 14 with respect to the base, but they permit vertical movement when the upper structure is to be detached from the base.

The lower ends of the end members 14 and 15 are provided with integral inturned flanges or feet 58 and 59 respectively which seat solidly upon the base 10. The foot 58 is notched as at 60 substantially centrally thereof and the finger 53 of the locking lever moves into this notch to lock the elements together. The base 10 is provided with a slot 61 through which the finger 53 projects, as clearly shown in Figure 1.

The operation of the device will be apparent from the foregoing description. The bending of the lips 20 and 26 of the rack elements in the manner described serves to secure the two rack members to each other with the heating elements properly positioned thereon. These lips extend through the openings 31 of the mica sheets, and accordingly these sheets are prevented from becoming displaced. Each of the rack members has the lips 20 and 26 thereof formed to one side of the center, and since the two rack members are identical with each other, the lips 20 and 26 of the two rack members are arranged adjacent opposite ends thereof, as shown in Figure 1. It will be apparent that only one set of dies need be provided for blanking and stamping the rack members, and each of these members is formed of a single sheet of material. After the rack unit is placed within the device, the lips 20 and 23 are bent outwardly or spread apart, thus anchoring the rack unit within the toaster. The spreading of the lips 23 of the lower rack members prevents the spreading of the lower extremities of the end members 14 and 15 when the upper structure is detached from the base and the engagement of the ends of the flange 25 with the end members 14 and 15 prevents the lower extremities of these members from moving toward each other.

Figure 2:
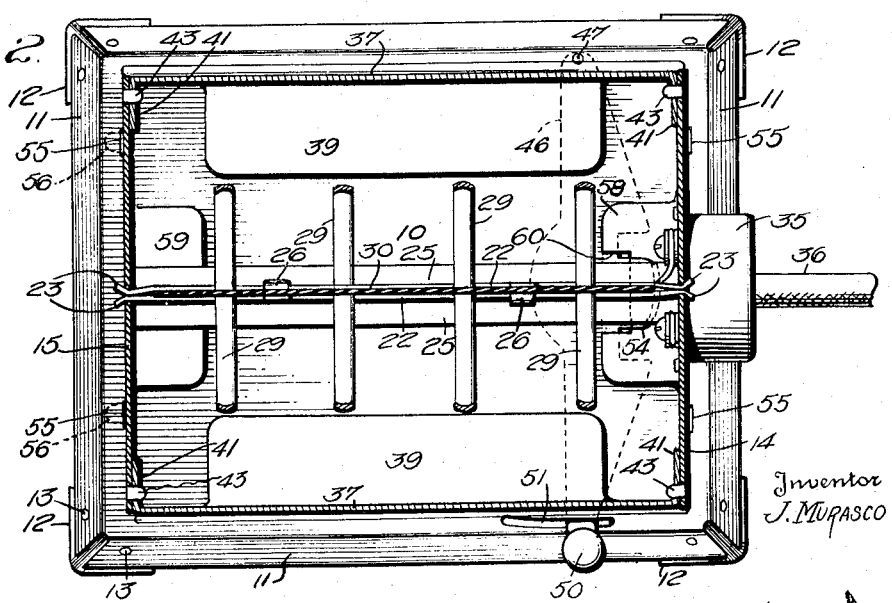
Figure 2 is a section on line 2—2 of Figure 1.

As previously stated, it is the more or less common practice to toast bread slices which have been previously buttered, and during the toasting operation, some of the butter drips downwardly to the base 10 together with some of the crumbs of the bread. It is highly desirable that means be provided for permitting the base structure to be properly cleaned, and accordingly the base detaching means is provided. When it is desired to disconnect the upper structure from the base, the handle or finger piece 50 is moved inwardly or toward the left as viewed in Figure 2, whereupon the latch 53 is released from the foot or flange 58. The adjacent end of the upper structure is then moved upwardly with the body of the device pivoting about the portion of the ears 56 which project through the openings 55.

After the upper structure has been tilted to an angle of approximately 45 degrees, the lips 56 may be withdrawn from the openings 55, whereupon the upper structure is wholly disconnected from the base. The base thereupon may be readily washed or wiped off. The lower members of the bread rack unit, and particularly the flanges 25, also can be wiped clean of any butter or crumbs while the upper structure is detached from the base.

To replace the elements in assembled form, the upper structure is tilted again to an angle of approximately 25 degrees, whereupon the ears 56 are inserted in the openings 55, and the upper structure is then moved downwardly to insert the lips 57 into the adjacent openings 55. The finger piece 50 is then moved toward the right as viewed in Figure 2, and the latch 53 engages the foot piece 58 to firmly latch the parts together. The foot pieces 58 and 59 form a solid foundation by means of which the upper structure rests upon the base, while the foot piece 58 performs the additional function of providing means engageable by the latch 53 to lock the parts together.

From the foregoing it will be apparent that the present device possesses all of the advantages of a conventional toaster as to performance, durability, etc. and at the same time, it is extremely economical to manufacture because of the simple structure of the bread rack unit. The members 27 obviously support the bread slices when the device is in operation, and these elements are integral parts of the rack members. It also will be apparent that the upper structure is readily detachable from the base for cleaning purposes, while the connection between the parts is as rigid as the parts of the conventional toaster which are permanently secured together.

It is to be understood that the form of the invention herewith shown and described is to be taken as a preferred example of the same and that various changes in the shape, size and arrangements of parts may be made without departing from the spirit of the invention or the scope of the subjoined claims.

I claim:

1. A toasting device comprising a base having a horizontal top provided in opposite edge portions with openings, an upper toasting structure including a pair of end members one of which is provided with depending lips engageable in the openings at one edge portion of the base and a portion lying flat against the top of said base, the other end member being provided with lips extending downwardly and then away from the first named end member and engageable in the openings at the other edge portion of said base, and a locking lever horizontally arranged beneath said base and pivotally connected thereto at one end, said base being provided with a slot remote from the pivot of said lever, said lever being provided with an integral vertically offset locking lip projecting upwardly through said slot and engageable with said portion of the first named end member.

2. A toasting device comprising a base having a horizontal top provided in opposite edge portions with openings, an upper toasting structure including a pair of end members one of which is provided with depending lips engageable in the openings at one edge portion of the base, the other end member being provided with lips extending downwardly and then away from the first named end member and engageable in the openings at the other edge portion of said base, and a locking lever arranged beneath said base and pivotally connected at one end of said base adjacent the first named edge portion thereof, said base being provided with a slot through which the opposite end of said lever projects and provided between said slot and the pivot of the lever with a second slot, said lever being provided with an upwardly offset locking lip extending upwardly through said second slot and engageable with a portion of the adjacent end member.

3. A toasting device comprising a base having a horizontal top, an upper toasting structure arranged on said top, means connected between one end of said toasting structure and said horizontal top for preventing relative movement therebetween, a horizontal member carried by the other end of said toasting structure above said horizontal top, and a locking lever pivotally connected to said base in contact with the lower face of the horizontal top thereof, said base being provided with a slot, said lever having an upwardly offset locking lip extending upwardly through said slot and engageable with the upper face of said horizontal member.

4. A toasting device comprising a base having a horizontal top provided in opposite edge portions with openings, an upper toasting structure including a pair of end members one of which is provided with depending lips engageable in the openings at one edge portion of the base, the other end member being provided with lips extending downwardly and then away from the first named end member and engageable in the openings at the other edge portion of said base, each of said end members being provided at its lower end with an inwardly extending horizontal foot resting on said base, and a locking lever arranged adjacent the first named edge portion of said base and pivotally connected thereto, said base being provided with a slot remote from the pivot of the lever and through which the other end of said lever projects, said base being provided intermediate said slot and the pivot of the lever with a second slot, said lever being provided intermediate its ends with an upwardly offset locking lip extending through said second slot and movable to a position over the adjacent foot.

5. A toasting device comprising a base having a horizontal top provided in opposite edge portions with openings, an upper toasting structure including a pair of end members one of which is provided with depending lips engageable in the openings at one edge portion of the base, the other end member being provided with lips extending downwardly and then horizontally away from the first named end member and engageable in the openings at the other edge portion of said base, each of said end members being provided at its lower end with an inwardly extending horizontal foot resting on said base, and an elongated locking lever arranged beneath said base and pivotally connected at one end thereto adjacent said first named end portion, the other end portion of said locking lever contacting with the lower face of said base, said locking lever being provided with a lip extending upwardly and then horizontally and movable to a position over a portion of the adjacent foot.

6. A toasting device comprising a base having a horizontal top, an upper toasting structure arranged on said top, means connected between one end of said toasting structure and said horizontal top for preventing relative movement therebetween, a horizontal member carried by the other end of said toasting structure and lying flat against said horizontal top, and a locking lever pivotally connected to said base and having a locking lip overhanging and engaging the top of said horizontal member, said locking lever having a portion engaging against the lower face of said horizontal top adjacent said locking lip to cooperate with the latter in effecting a downward clamping action against said horizontal member when said locking lever is in operative position with said lip overlying said horizontal member.

7. A toasting device comprising a base having a horizontal top provided in opposite edge portions thereof with an opening, an upper toasting structure being provided at one end thereof with a depending lip engageable in the opening at one edge portion of the base and with a portion lying against the top of said base and being provided at the other end thereof with a lip engageable in the opening at the other end portion of the base, the said last named lip extending under said base to restrain said structure from vertical movement relative to said base, and a locking member arranged beneath said base and slidably engaged therewith, said base being provided with a slot adjacent said locking member, said locking member being provided with a locking lip projecting through said slot and engageable with said portion of the toasting structure lying against the top of the said base.

8. A toasting device comprising a base having a horizontal top provided in opposite edge portions thereof with an opening, an upper toasting structure being provided at one end thereof with a depending lip engageable in the opening at one edge portion of the base and being provided at the other end thereof with a lip engageable in the opening at the other end portion of the base, the said last named lip extending under said base to restrain said structure from vertical movement relative to said base, and a locking member arranged beneath said base and slidably engaged therewith at one end of said base adjacent the first named edge portion thereof, said base being provided with a slot through which part of said locking member projects for operation of the locking member, said base being also provided with a second slot, said locking member being provided with a locking lip projecting through said second slot and engageable with a portion of the adjacent toasting structure.

9. A toasting device comprising a base having a horizontal top provided in opposite edge portions with openings, an upper toasting structure being provided at one end thereof with a depending lip engageable in the opening at one edge portion of the base and being provided at the other end thereof with a lip engageable within the opening at the other end of the base, the said last named lip extending under said base to restrain said structure from vertical movement relative to said base, a horizontal foot extending inwardly from each end of said structure and resting on said base, and a locking member arranged adjacent the first named edge portion of said base and movably engaged thereto, said base being provided with a slot through which part of said locking member projects for operation of the locking member, said base being provided with a second slot, said locking member being provided with a locking lip extending through said second slot and movable to a position over the adjacent foot.

10. A toasting device comprising, in combination, a base having a horizontal plate portion, a toasting structure carried by said base, means for securing said structure against horizontal movement on said base, a supporting member extending horizontally from the lower portion of said toasting structure, said supporting member being adapted to engage the horizontal plate portion of said base, a locking member for securing said structure against upward movement relative to said base, said locking member being slidably mounted on said base below said plate portion, a locking lip extending from said locking member to above said plate portion and being adapted to slide over said supporting member, and means for sliding said locking member so as to lock and unlock said base to said toasting structure.

11. A toasting device comprising, in combination, a base having a horizontal plate portion, a toasting structure carried by said base, a supporting member extending from said toasting structure, said supporting member engaging the top surface of the horizontal plate portion of said base, a locking member for securing said structure to the base, the said locking member being slidably mounted on the lower surface of the horizontal plate portion and having a portion extending above said plate portion, said portion being adapted to slide over said supporting member and to lock said supporting member to said base, and means for sliding said locking member so as to lock and unlock said base to said toasting structure.

12. A toasting device comprising, in combination, a base having a horizontal plate portion, a toasting structure carried by said base, a locking member carried by said base, said locking member having a portion adapted to engage said toasting structure above said horizontal plate portion so as to lock said toasting structure to said base, and means extending from said base for operating said locking member so as to lock and unlock the said toasting structure and said base.

13. A toasting device comprising, in combination, a base member having a supporting surface, a toasting member having a supporting portion resting on said supporting surface, a locking member movably carried by one of said members for locking said members together, said locking member having a portion adapted to engage said supporting portion of the toasting member and having another portion adapted to engage said base member, and means for moving said locking member so as to lock and unlock the said toasting structure and said base together.

JOSEPH MURASCO.